July 16, 1940.　　　H. M. LUCAS ET AL　　　2,208,311
HORIZONTAL BORING MACHINE
Filed Feb. 3, 1939　　　3 Sheets-Sheet 3

INVENTORS
HENRY M. LUCAS
HALLIS N. STEPHAN
BY Kwis Hudson & Kent
ATTORNEYS

Patented July 16, 1940

2,208,311

UNITED STATES PATENT OFFICE 2,208,311

HORIZONTAL BORING MACHINE

Henry M. Lucas and Hallis N. Stephan, Cleveland Heights, Ohio, assignors to The Lucas Machine Tool Company, Bratenahl, Ohio, a partnership composed of Henry M. Lucas, George A. Yost, and John A. Leighton Application February 3, 1939, Serial No. 254,436

1 Claim. (Cl. 29—26)

The present invention relates to machine tools and more particularly to horizontal boring machines.

With present day horizontal boring machines, especially the larger table type machines, it is often difficult, if not impossible, for the operator to observe the tool since his view is obstructed by the work. The principal object of the present invention is the provision of a novel and improved horizontal boring machine comprising steps and/or platforms on the bed and saddle so constructed and arranged that the operator can readily step up on the machine and walk around thereon, thus giving him a clear view of any part of the work, etc.

The present invention resides in certain details of construction and combinations and arrangements of parts, and further objects and advantages will be apparent from the following description of the preferred embodiment thereof described with reference to the accompanying drawings forming a part of this specification, in which similar reference characters designate corresponding parts, and in which.

Figure 1:
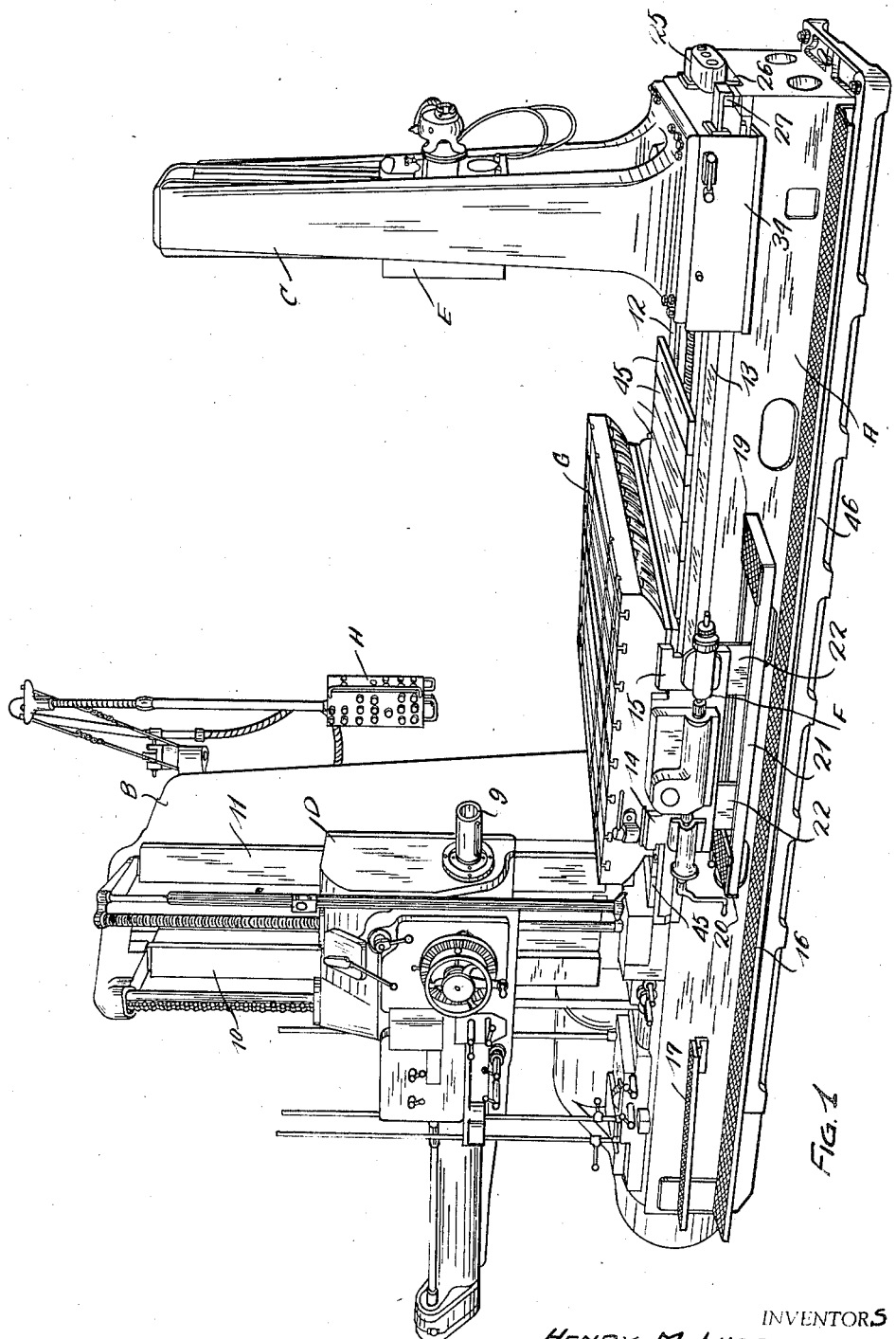
Fig. 1 is a perspective view of a horizontal boring machine embodying the present invention.

Referring to the drawings, the machine shown therein comprises a bed or frame A including a vertical spindle head column B adjacent to one end thereof and a vertical backrest block column C adjacent to the other end thereof; a spindle 9 rotatably supported in a spindle head D slidably supported on vertical ways 10 and 11 on the spindle head column B; a backrest block E slidably supported on suitable ways on the backrest column C; a saddle F slidably supported on horizontal longitudinal ways 12 and 13 on the bed A; and a table G slidably supported on horizontal transverse ways 14 and 15 on the saddle F. The various operations and movements of the different elements of the machine are adapted to be controlled from a pendant control station H described and claimed in our co-pending application Serial No. 243,616 entitled "Boring machine." Per se, this mechanism forms no part of the present invention and which will not be described in detail.

The machine shown is of the table type, and, according to the provisions of the present invention, both the bed A and the saddle F are provided with steps or platforms on both sides of the machine which enable the operator to readily step up on the machine and walk thereabout. This is especially desirable in setting up work and in doing certain operations where the operator otherwise would not have a view of the tool. As shown, the frame A of the machine is provided with two steps or platforms 16 and 17 at the front side of the machine, the first step 16 of which is located a convenient height above the floor and extends substantially the entire length of the bed A. The step 17 is located above the platform 16 at the spindle end of the machine only. The lower platform 16 projects a considerable distance from the frame A while the upper platform 17 projects only approximately half as far from the frame A as platform 16. With this construction it will be readily apparent that an operator can easily step from the floor onto the step or platform 16, then to the step or platform 17, and from the platform 17 to the base of the machine adjacent to the spindle head if necessary or desirable. A step or platform 18 is provided at the rear side of the machine similar to the lower step 16 at the front of the machine except that it extends merely to the spindle head column B. Like the front step 16, the rear step 18 is fixed to the frame or bed A and is located a convenient distance above the floor. The saddle F has two platforms or steps 19 and 20 secured to opposite sides of both ends thereof. The platforms 19 and 20 may be said to extend generally transversely of the machine, are approximately on a level with the step or platform 17, and project to the front and rear of the machine a considerable distance farther than the platforms 16 and 18. As shown, the platforms 19 and 20 project about three times as far out from the frame as the platforms 16 and 18. The steps or platforms 19 and 20 may be connected to the saddle F in any convenient manner, as shown, and they are fixed to opposite ends of angle irons 21 attached to the underside of the saddle F by plates 22.

Figures 5, 6, 7:
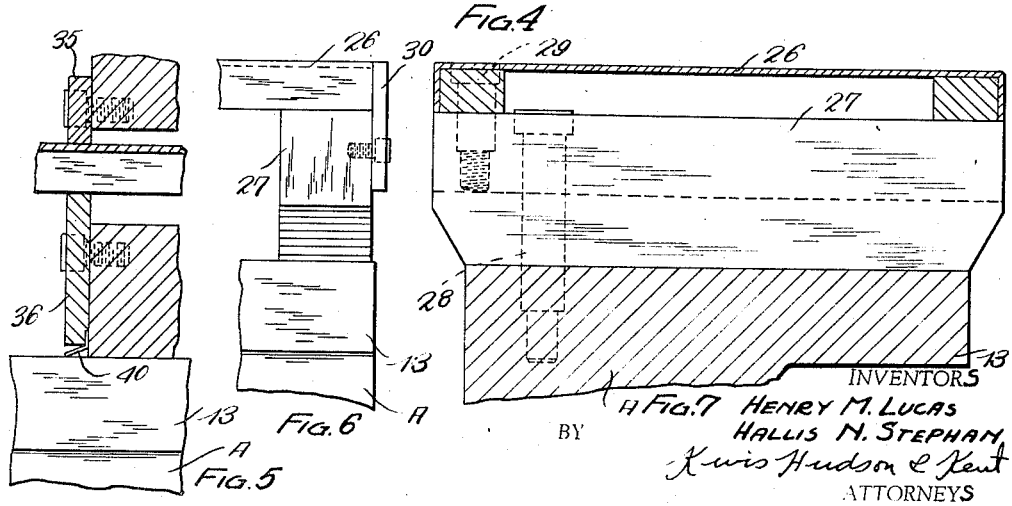
Fig. 5 is an enlarged view of a portion of Fig. 3.
Fig. 6 is an enlarged view of a portion of Fig. 3.
Fig. 7 is a section approximately on the line 7—7 of Fig. 6.

In addition to the platform means referred to, the present invention also contemplates the provision of way guards for the longitudinal ways 12 and 13 upon which the saddle E and the backrest block column C are slidably supported and platform means spanning the space therebetween. The way guards comprise inverted channel-shaped members 25 and 26 located above the bed ways 12 and 13, respectively, and overlying the same. The way guards are supported at opposite ends by members or blocks 27 secured to the bed ways as by bolts 28, to which blocks 27 the way guards 25 and 26 are connected as by bolts 29 (see Figs. 6 and 7). End plates 30 secured to the blocks 27 help to retain the way guards in position.

The way guards 25 and 26 project through suitable apertures 32 and 33 formed in the saddle F and the backrest column base 34 respectively. In each case where the way guard enters either the saddle F or the backrest column base 34, the respective member is provided with an upper member or plate 35 secured thereto adjacent the upper part of the aperture through which the way guard extends. The member 35 conforms closely to the upper surface of the way guard and the lower edge of the member has only a slight clearance with the way guard. In operation, the member 35 wipes the chips, etc., off of the upper surface of the way guard and prevents their getting into the interior of the saddle etc. A second member 36 located below the upper member 35 cooperates with the member 35 to form a restricted aperture through which the way guard projects. The member 36 forms a support for the way guard. In the embodiment of the invention shown, opposite sides of the channel shaped way guards are reinforced by rectangular shaped members 37 welded to the underside of the way guard, which members 37 bear on the lower plates 38. Opposite sides of the saddle F and the backrest column base 34 are provided with bed way wipers in the form of flexible thin metal members 40 secured underneath the lower plates or members 36, which members 40 engage the bed ways and wipe the chips, etc., therefrom as the respective members to which they are attached are reciprocated or moved along the bed ways.

In the embodiment of the invention shown, the platform means spanning the space between the way guards 25 and 26 comprise a plurality of members 45 made preferably of some non-skid material, resting upon the way guards 25 and 26 and spanning the space therebetween. The members 45 may be of any convenient width and any desired number may be employed on either side of the saddle F, depending upon the position of the saddle. As shown, five are utilized on the backrest column side of the saddle and two on the spindle head side of the saddle.

Figure 2:
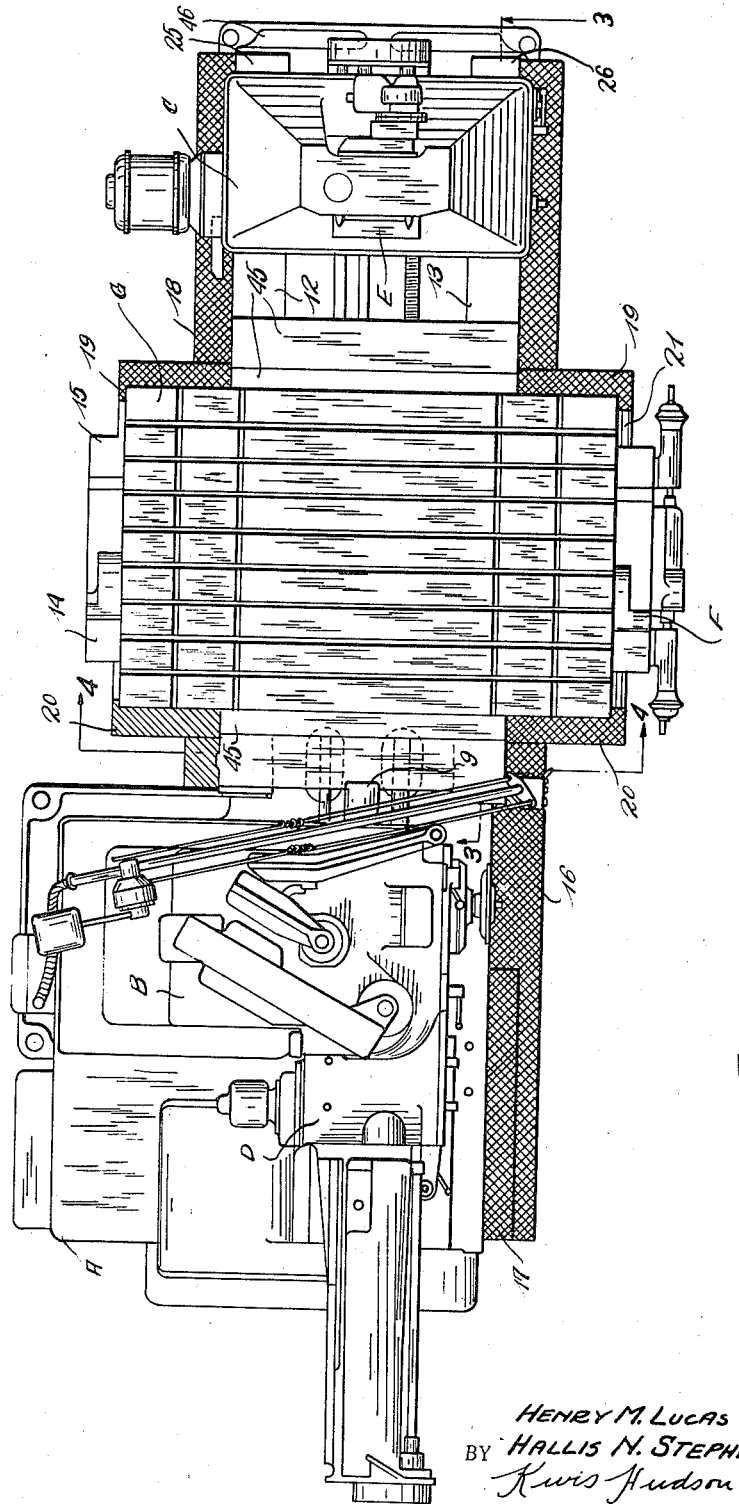
Fig. 2 is a plan view of the machine shown in Fig. 1.
Figure 3:
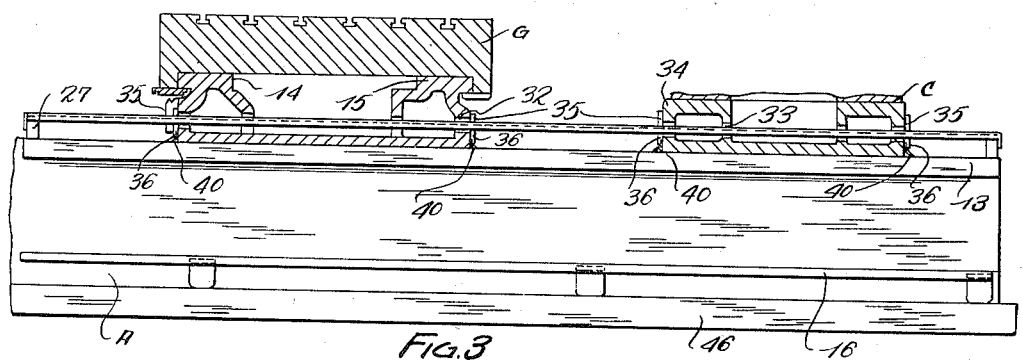
Fig. 3 is a section approximately on the line 3—3 of Fig. 2.
Figure 4:
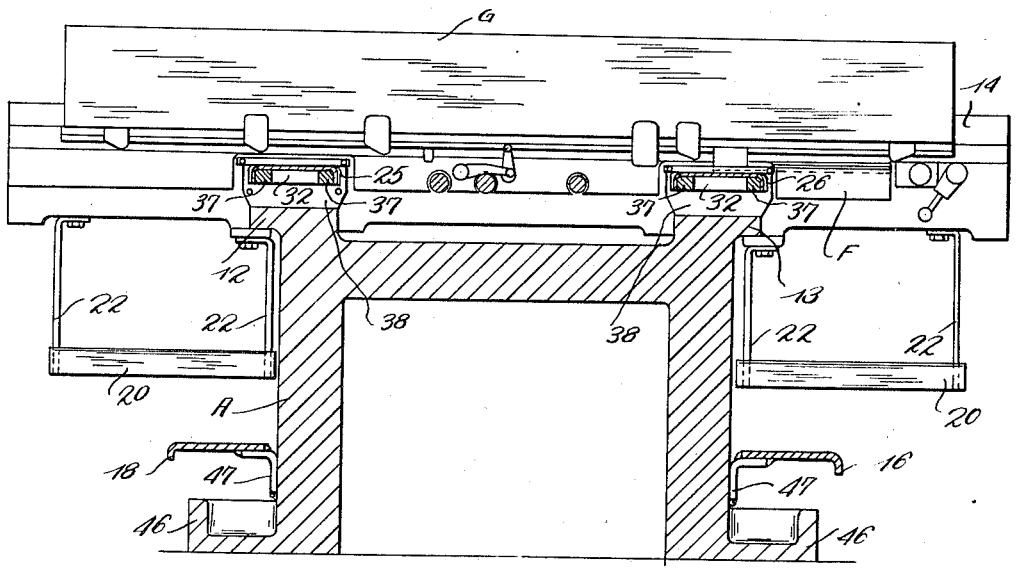
Fig. 4 is a section approximately on the line 4—4 of Fig. 2.

The present machine is also provided with means to catch the surplus oil which drips from the ways 12 and 13 etc. in the form of a trough 46 extending about three sides of the base, that is, the front and rear sides and right-hand end as viewed in Figs. 1 and 2. The trough does not extend the entire length of the front or rear of the base but in the front terminates short of the left-hand end as shown in Fig. 1 and in the rear extends only to the left-hand end of the spindle head column B, as viewed in Fig. 2. As shown, the trough 46 is formed integral with the base and is located underneath the platforms 16 and 18. The platforms or steps 16 and 18 are supported on spaced angle irons 47 fastened thereto and to the base of the machine and are spaced slightly from the base so that the surplus oil from the ways 12 and 13 can run down the sides of the base into the trough 46.

From the foregoing description of the preferred embodiment of the invention, it will be apparent that the objects of the invention heretofore enumerated have been accomplished and that a horizontal boring machine has been provided having simple, reliable, and convenient platform means which enables the operator to step up on the machine and walk around thereon when necessary. While the preferred embodiment of the invention has been described in considerable detail, the invention is not limited to the particular construction shown which may be varied within the scope of the invention. It is our intention to cover hereby all adaptations, modifications, and variations of our invention which come within the practice of those skilled in the art to which it relates, and we particularly point out and claim as our invention the following:

A horizontal boring machine comprising a base, a vertical spindle head column on said base, a spindle head slidably supported on said spindle head column for vertical movement, a horizontal spindle rotatably supported in said spindle head, a saddle slidably supported on said base for movement longitudinally of said spindle, a table slidably supported on said saddle for movement transversely of said spindle, a step or platform underneath said saddle secured to said base and extending substantially the entire length thereof, a short step or platform secured to said base adjacent to the spindle head end thereof and located above the first mentioned step or platform, and a plurality of steps or platforms carried by said saddle at both sides of one end thereof, the steps or platforms on said saddle being above the first mentioned step and projecting to the front of the machine considerably farther than the first mentioned step.

HENRY M. LUCAS.
HALLIS N. STEPHAN.